US012712209B2

(12) United States Patent
Hattori et al.

(10) Patent No.: US 12,712,209 B2
(45) Date of Patent: Aug. 18, 2026

(54) BATTERY AND METHOD FOR MANUFACTURING SAME

(71) Applicant: SANYO Electric Co., Ltd., Daito (JP)

(72) Inventors: Sadahiro Hattori, Kanagawa (JP); Kazumichi Shimizu, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 845 days.

(21) Appl. No.: 17/040,173

(22) PCT Filed: Feb. 18, 2019

(86) PCT No.: PCT/JP2019/005858
§ 371 (c)(1),
(2) Date: Sep. 22, 2020

(87) PCT Pub. No.: WO2019/187775
PCT Pub. Date: Oct. 3, 2019

(65) Prior Publication Data

US 2021/0126289 A1 Apr. 29, 2021

(30) Foreign Application Priority Data

Mar. 28, 2018 (JP) ................................ 2018-062220

(51) Int. Cl.
*H01M 10/0587* (2010.01)
*B23K 26/21* (2014.01)
(Continued)

(52) U.S. Cl.
CPC ......... *H01M 10/0587* (2013.01); *B23K 26/21* (2015.10); *H01M 10/0422* (2013.01);
(Continued)

(58) Field of Classification Search
CPC ......... H01M 10/0587; H01M 10/0422; H01M 50/543
See application file for complete search history.

(56) References Cited

U.S. PATENT DOCUMENTS

2005/0042506 A1* 2/2005 Tomimoto ........ H01M 10/0431 429/161
2009/0317712 A1 12/2009 Kim et al.
(Continued)

FOREIGN PATENT DOCUMENTS

JP 3-34505 A 2/1991
JP 03034505 A * 2/1991
(Continued)

OTHER PUBLICATIONS

International Search Report dated May 14, 2019 issued in counterpart International Application No. PCT/JP2019/005858. (2 pages).

*Primary Examiner* — Brian R Ohara
*Assistant Examiner* — Brent C Thomas
(74) *Attorney, Agent, or Firm* — WHDA, LLP

(57) ABSTRACT

The present disclosure aims, in a battery, to suppress intrusion of foreign materials generated by sputtering in the battery while a decrease in battery capacity is suppressed. A battery according to one embodiment of the present disclosure includes an exterior package can (51) which receives an electrode body, the electrode body includes a lead connected to one of a positive electrode and a negative electrode, the lead has a U-shaped portion (18) having a cross-sectional U shape formed by folding, and at least a part of a portion of the U-shaped portion which is in contact with the exterior package can (51) and the exterior package can (51) are welded to each other with a welding portion formed by energy beams radiated from the outside of the exterior package can (51).

14 Claims, 7 Drawing Sheets

(51) Int. Cl.
*H01M 10/04* (2006.01)
*H01M 50/10* (2021.01)
*H01M 50/107* (2021.01)
*H01M 50/536* (2021.01)
*H01M 50/543* (2021.01)
*H01M 50/566* (2021.01)
*H01M 50/559* (2021.01)

(52) U.S. Cl.
CPC ....... *H01M 50/107* (2021.01); *H01M 50/536* (2021.01); *H01M 50/566* (2021.01); *H01M 50/559* (2021.01)

(56) References Cited

U.S. PATENT DOCUMENTS

2016/0104914 A1* 4/2016 Lee .................... H01M 50/548 429/94
2016/0329552 A1* 11/2016 Tyler .................. H01M 50/249
2017/0069901 A1 3/2017 Haraguchi et al.
2019/0237737 A1* 8/2019 Berlureau ........... H01M 50/538
2020/0266416 A1* 8/2020 Lee .................... H01M 50/536

FOREIGN PATENT DOCUMENTS

JP 4-162351 A 6/1992
JP 2000-331717 A 11/2000
JP 2003-151527 A 5/2003
JP 2004-158318 A 6/2004
JP 2009-129553 A 6/2009
JP 2009-170365 A 7/2009
JP 2010-3686 A 1/2010
JP 2015-162326 A 9/2015
JP 2016-173972 A 9/2016
WO 2013/038676 A1 3/2013
WO 2017/051516 A1 3/2017

* cited by examiner 18
18
20
19
51
52
41
44
43
42
40
40
40
17
51a

BATTERY AND METHOD FOR MANUFACTURING SAME

TECHNICAL FIELD

The present disclosure relates to a battery in which a lead and an exterior package can are welded to each other and a method for manufacturing the battery.

BACKGROUND ART

In association with an improvement in performance and an increase in capacity, in recent years, a secondary battery has been expected to be mounted on a vehicle and to be used, for example, for an electric power supply to a driving motor therefor. Although a nonaqueous electrolyte secondary battery is able to obtain high energy, when an internal short circuit occurs by intrusion of metal foreign materials into the battery, the battery itself may disadvantageously cause heat generation or the like in some cases.

Heretofore, connection between an exterior package can and a lead connected to one of a positive electrode and a negative electrode of an electrode body has been mainly performed by resistance welding. However, by this resistance welding, since sputtering occurs in the battery in a welding process, and metal foreign materials intrude into the battery, because of voltage failure, the manufacturing quality, the safety, and the reliability of the battery may be disadvantageously degraded in some cases. Hence, in recent years, according to several techniques, the generation of sputtering is suppressed such that, by radiation of energy beams, such as laser light, from the outside of the exterior package can, the exterior package can and the lead are welded to each other (for example, see PTLs 1 to 3).

CITATION LIST

Patent Literature

PTL 1: Japanese Published Unexamined Patent Application No. 4-162351
PTL 2: Japanese Published Unexamined Patent Application No. 2004-158318
PTL 3: Japanese Published Unexamined Patent. Application No. 2010-3686

SUMMARY OF INVENTION

Technical Problem

In the case in which energy beams, such as laser light, are radiated from the outside of an exterior package can, when a molten portion formed at the exterior package can and a lead by the above radiation penetrates the lead, sputtering may unfavorably occur in the battery in some cases. In order to suppress the generation of sputtering as described above, an increase in thickness of the entire lead may be conceived; however, in this case, since a space of the lead occupied in the exterior package can is increased, a volume energy density of the battery is decreased, and as a result, the battery capacity may be decreased thereby.

In a battery and a method for manufacturing the same, the present disclosure aims to suppress intrusion of foreign materials generated by sputtering in the battery while the decrease in battery capacity is suppressed.

Solution to Problem

A battery according to the present disclosure comprises: an electrode body in which at least one positive electrode and at least one negative electrode are spirally wound or laminated with at least one separator interposed therebetween; and an exterior package can which receives the electrode body. In the battery described above, the electrode body includes a lead connected to one of the positive electrode and the negative electrode, the lead has a U-shaped portion having a cross-sectional U shape formed by folding, and the exterior package can and at least a part of a portion of the U-shaped portion which is in contact with the exterior package can are welded to each other with a welding portion formed by energy beams radiated from the outside of the exterior package can.

A method for manufacturing a battery according to the present disclosure is a method for manufacturing the battery according to the present disclosure and comprises: a welding step of welding the lead to the exterior package can while the lead connected to one of the positive electrode and the negative electrode is folded. In the welding step described above, energy beams are radiated from the outside of the exterior package can to an area of the exterior package can which faces a part of the U-shaped portion of the lead in contact with the exterior package can to weld the exterior package can and the lead to each other with the welding portion.

Advantageous Effects of Invention

According to the battery and the method for manufacturing the same of the present disclosure, while the decrease in battery capacity is suppressed, the intrusion of foreign materials generated by sputtering in the battery can be suppressed.

DESCRIPTION OF EMBODIMENTS

Hereinafter, embodiments according to the present disclosure will be described in detail with reference to the attached drawings, in the following description, particular shapes, materials, numerical values, directions, and the like are described by way of example in order to facilitate the understanding of the present disclosure and each may be appropriately changed in accordance with the specification of a battery. In addition, in the following description, the term “approximately” indicates, besides the case in which at least two objects are exactly the same, the case in which at least two objects are regarded as substantially the same. Furthermore, when embodiments and modified examples are included in the following description, characteristics thereof have been assumed from the beginning to be appropriately used in conciliation.

In addition, hereinafter, although the case in which the battery is a cylindrical nonaqueous electrolyte secondary battery will be described, as the battery, for example, a square battery may also be used instead of a cylindrical battery. In addition, the battery is net limited to a lithium ion secondary battery which will be described below and may be another secondary battery, such as a nickel hydrogen battery or a nickel cadmium battery, or a primary battery, such as a dry battery or a lithium battery. In addition, an electrode body of the battery is not limited to a winding type which will be described below and may be a laminate type in which a plurality of positive electrodes and a plurality of negative electrodes are alternately laminated to each other with separators interposed therebetween.

Figure 1:
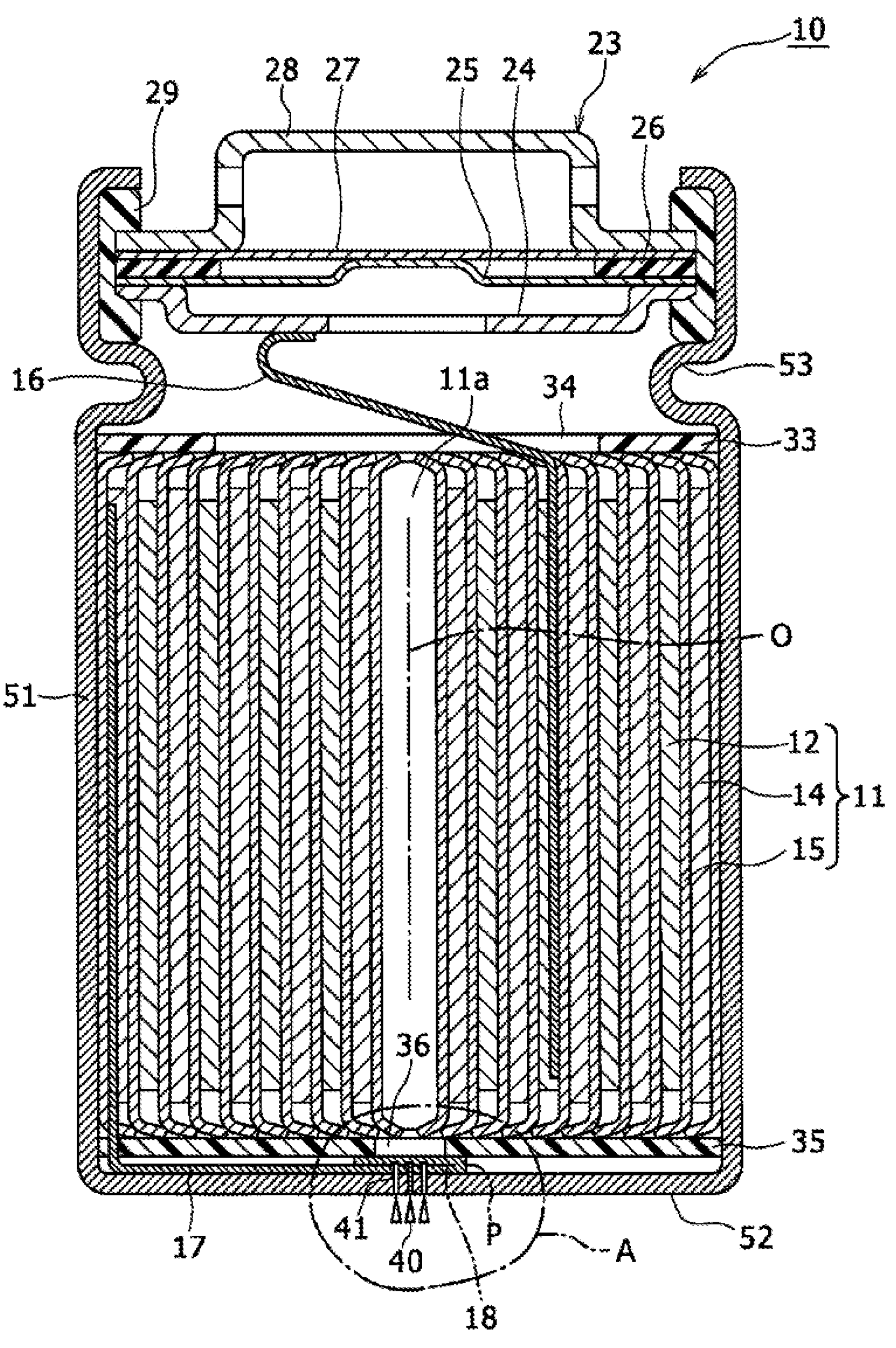
FIG. 1 is a cross-sectional view of a battery which is one example of an embodiment.
Figure 2:
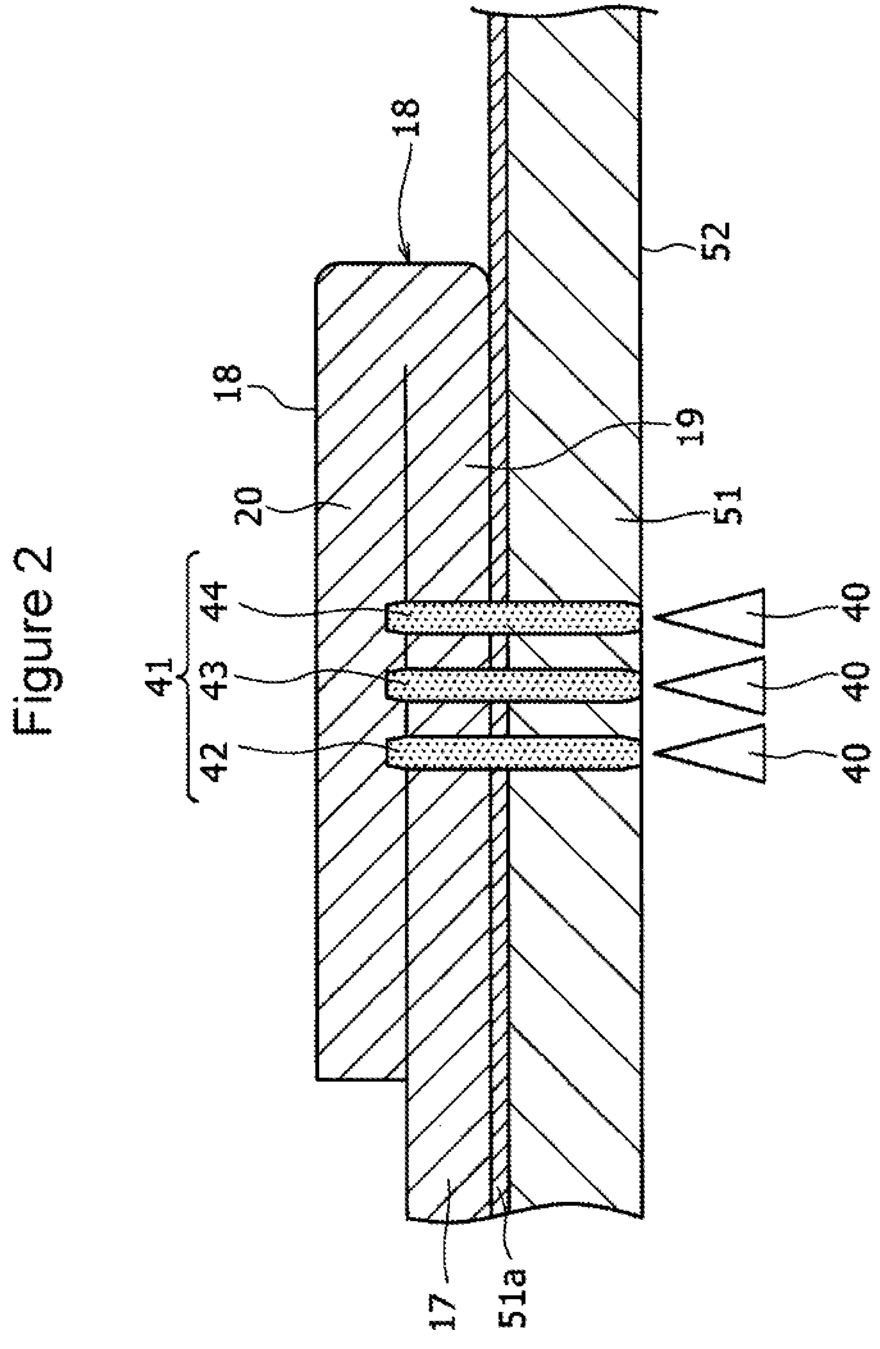
FIG. 2 is a partially omitted view of an A part shown in FIG. 1.
Figure 3:
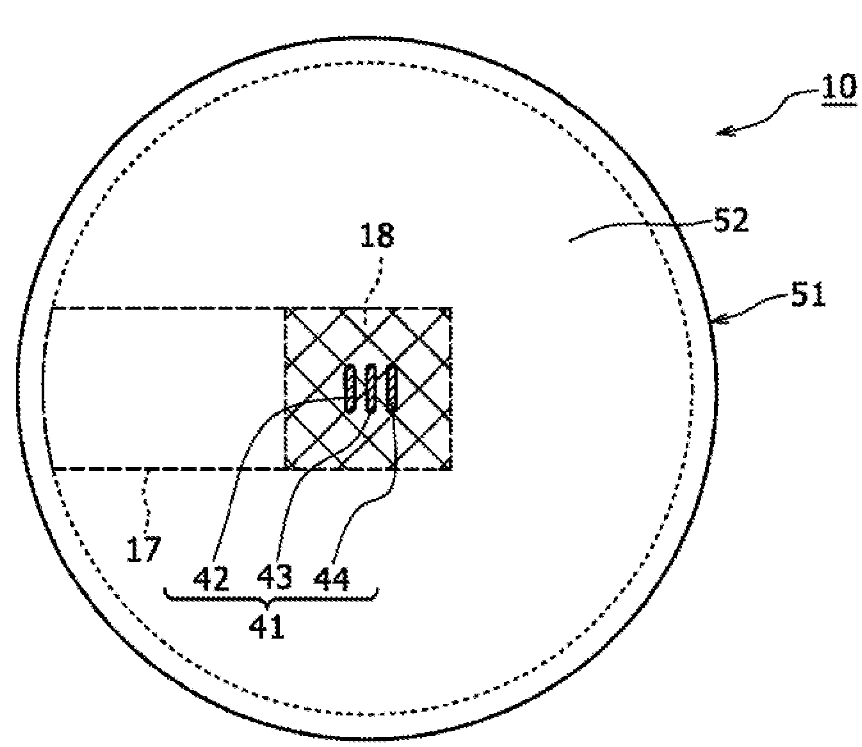
FIG. 3 is a view of a bottom surface of the battery shown in FIG. 1.

FIG. 1 is a cross-sectional view of a battery 10 which is one example of the embodiment. FIG. 2 is a partially omitted view of an A part shown in FIG. 1. FIG. 3 is a view of a bottom surface of the battery 10 shown in FIG. 1. In the battery 10 of the following embodiment, a negative electrode lead 17 has at its front end portion, a U-shaped portion 13 formed by folding. An exterior package can 51 and at least a part of a portion of the U-shaped portion 16 of the negative electrode lead 17 which is in contact with the exterior package can 51 are welded to each other with a welding group 41 formed by radiation of laser lights 40 from the outside of the exterior package can 51. The negative electrode lead 17 is bonded to a winding-finish side end portion of a negative electrode 14. The U-shaped portion 18 is formed by folding a part of the negative electrode lead 17 to the inside of the exterior package can 51 so as to be continuously apart from the exterior package can 51, the part of the negative electrode lead 17 being in contact with the exterior package can 51 from a connection side to the negative electrode 14 to the front end. Hereinafter, the battery 10 will be described in detail.

As shown in FIGS. 1 to 3 by way of example, the battery 10 includes a power generation element which contains a winding type electrode body 11 and a nonaqueous electrolyte (not shown) and the exterior package can 51. The winding type electrode body 11 includes a positive electrode 12, the negative electrode 14, and at least one separator 15, and the positive electrode 12 and the negative electrode 14 are laminated with the separator 15 interposed therebetween and are also spirally wound together. Hereinafter, in some cases, one axial direction side of the electrode body 11 may be called “upper side”, and the other axial direction side may be called “lower side”. The nonaqueous electrolyte contains a nonaqueous solvent and an electrolyte salt, such as a lithium salt, dissolved in the nonaqueous solvent. The nonaqueous electrolyte is not limited to a liquid electrolyte and may be a solid electrolyte using a gel polymer or the like.

The positive electrode 12 includes a belt-shaped positive electrode collector, and a positive electrode lead 16 is connected to this collector. The positive electrode lead 16 is an electrically conductive member to electrically connect the positive electrode collector to a cap 23 which functions as a positive electrode terminal and extends from an upper end of an electrode group to one direction side (upper side in FIG. 1) of an axial direction (up-to-bottom direction) of the electrode body 11. In this embodiment, the electrode group indicates a member in which the leads are removed from the electrode body 11. The positive electrode lead 16 is provided, for example, at an approximately central portion of the electrode body 11 in a radius direction.

The negative electrode 14 includes a belt-shaped negative electrode collector **14*a* (FIG. 4), and the negative electrode lead 17 is connected to this collector 14*a*. The negative electrode lead 17 is an electrically conductive member to electrically connect the negative electrode collector 14*a* to the exterior package can 51 which functions as a negative electrode terminal, is bonded to a winding-finish side end portion of the electrode group, and extends from a lower end of this winding-finish side end portion to the other direction side (lower side in FIG. 1**) in the axial direction.

A material forming each lead is not particularly limited. The positive electrode lead 16 may be formed from a metal containing aluminum as a primary component, and the negative electrode lead 17 may be formed from a metal containing nickel or copper as a primary component or a metal containing both nickel and copper. The negative electrode lead 17 may also be formed from nickel-plated iron.

By the exterior package can 51 and a sealing body 23, a metal-made battery case which receives the power generation element is formed. On an upper side and a lower side of the electrode group, insulating plates 33 and 35 are provided, respectively. The two insulating plates 33 and 35 are each formed, for example, from a resin and have through-holes 34 and 36, respectively, at the central portions thereof. The electrode group is provided between the two insulating plates 33 and 35 disposed in an up-to-bottom direction. The positive electrode lead 16 extends through the through-hole 34 of the upper insulating plate 33 to a sealing body 23 side and is electrically connected to a filter 24 since being welded to a bottom surface of the filter 24 which functions as a bottom plate of the sealing body 23. In the battery 10, the cap 26 which is a top plate of the sealing body 23 and which is electrically connected to the filter 24 functions as a positive electrode terminal.

The exterior package can 51 has a bottom portion 52 and is a bottom-closed cylindrical metal-made container which receives the power generation element. Between the exterior package can 51 and the sealing body 23, a gasket 29 is disposed, and hence, air-tightness in the battery case is secured. The exterior package can 51 has a projecting portion 53 which is formed, for example, by pressing a side surface portion from the outside and which supports the sealing body 23. The projecting portion 53 is preferably formed to have an annular shape along a circumferential direction of the exterior package can 51 so as to support the sealing body 23 by its upper surface. The sealing body 23 seals an opening of the exterior package can 51. The power generation element is received in the exterior package can 51 at a side lower than the projecting portion 53.

The exterior package can 51 is formed from a metal material to have a bottom-closed cylindrical shape. A material forming the exterior package can 51 is, for example, copper, nickel, iron, or an alloy thereof and is preferably iron or an iron alloy. When the exterior package can 51 is formed from iron, for example, in order to prevent corrosion of iron, and/or in order to improve a bonding strength to the negative electrode lead 17, a Ni plating layer 51*a* (FIG. 2) formed from nickel or a nickel alloy is preferably plated on an inner surface of the exterior package can 51. The thickness of the exterior package can 51 is, for example, approximately 0.2 to 0.5 mm, and the thickness of the Ni plating layer 51*a* is, for example, approximately 0.1 to 1 μm.

The sealing body 23 is preferably formed by laminating a plurality of members. In this embodiment, the sealing body 23 is formed by laminating the filter 24, a lower valve 25, an insulating plate 26, an upper valve 27, and the cap 28 in this order from a lower side.

The members (other than the insulating plate 26) of the sealing body 23 are electrically connected to each other. In particular, the filter 24 and the lower valve 25 are bonded to each other at the peripheral portions thereof, and the upper valve 27 and the cap 28 are also bonded to each other at the peripheral portions thereof. In addition, the lower valve 25 and the upper valve 27 are in contact with each other at the central portions thereof, and between the peripheral portions thereof, the insulating plate 26 is provided. When an inside pressure of the battery 10 is increased, first, the lower valve 25 is fractured. Accordingly, the upper valve 27 is swollen toward an upper side, so that the electrical connection with the lower valve 25 is blocked. When the inside pressure is further increased, the upper valve 27 is fractured, and a gas generated thereby is discharged outside through a gas vent hole of the cap 28.

The negative electrode lead 17 extends to a bottom portion 52 side of the exterior package can 51 along the outside of the lower insulating plate 35. The negative electrode lead 17 is bent at an approximately right angle near the bottom portion 52 of the exterior package can 51 and is disposed along the bottom portion 52 so as to extend to a place which faces a hollow winding core portion 11*a* of the electrode body 11 through the through-hole 36 of the lower insulating plate 35.

Since being folded at its front end portion which faces the bottom portion 52, the negative electrode lead 17 has the U-shaped portion 18 having a cross-sectional U shape. The U-shaped portion 18 is formed by folding a part of the negative electrode lead 17 to the inside of the exterior package can 51 at a return point P functioning as a fulcrum so as to be continuously apart from the bottom portion 52, the part, of the negative electrode lead 17 being in contact with the bottom portion 52 from the connection side to the negative electrode 14 to the front end. Accordingly, the U-shaped portion 18 includes an outside section 19 and an inside section 20 formed at a front end side of the U-shaped portion 18 than this outside section 19, and the outside section 19 and the inside section 20 are overlapped with each other, in addition, the front end of the negative electrode lead 17 at a U-shaped portion 18 side is folded to the inside of the exterior package can 51 so as to be apart from the exterior package can 51.

In the negative electrode lead 17, the outside section 19 of the U-shaped portion 18 is overlapped on and is brought into contact with an inner surface of the bottom portion 52 so as to be disposed along the bottom portion 52. In addition, in the state described above, since the laser lights 40 are radiated from the outside of the exterior package can 51 to areas of the bottom portion 52 which face the outside section 19 of the U-shaped portion 18, the exterior package can 51 and the outside section 19 of the negative electrode lead 17 are welded to each other with the welding group 41.

As shown in FIGS. 2 and 3, the welding group 41 is formed of three welding portions 42, 43, and 44. The welding portions 42, 43, and 44 are each formed by radiation of the laser light 40 from the outside of the exterior package can 51. The laser light 40 corresponds to energy beams. The welding group 41 may reach the inside section 20 of the negative electrode lead 17 so as to weld the exterior package can 51 to the outside section 19 and the inside section 20 of the negative electrode lead 17. Between the outside section 19 and the inside section 20, a space may be formed. As shown in FIG. 3, when the bottom portion 52 is viewed from the outside, the entire welding group 41 is included in an area (diagonal grid in FIG. 3) of the bottom portion 52 which faces the U-shaped portion 13.

As shown in FIG. 3, when the welding portions 42, 43, and 44 are viewed from the outside (lower side in FIG. 1) of the bottom portion 52, the plan shapes thereof are each a straight line. In addition, the welding portion of the present, disclosure indicates a portion formed from a molten mark which is formed by melting the exterior package can 51 and the negative electrode lead 17 by radiation of the laser light 40 thereto, followed by solidification. The welding group 41 and a welding step will be described later in detail.

Again with reference with FIG. 1, the electrode body 11 has a winding structure in which the positive electrode 12 and the negative electrode 14 are spirally wound with the separators 15 interposed therebetween. Since being formed to have belt shapes and being spirally wound together, the positive electrode 12, the negative electrode 14, and the separators 15 are alternately laminated to each other in the radius direction of the electrode body 11. In this embodiment, the winding core portion 11*a* including a winding central axis O of the electrode body 11 is a cylindrical space.

The positive electrode 12 includes a positive electrode collector and at least one positive electrode active material layer formed on the collector. For example, on two surfaces of the positive electrode collector, the positive electrode active material layers are formed. For the positive electrode collector, for example, foil of a metal, such as aluminum, stable in a potential range of the positive electrode or a film having a surface layer formed of the metal mentioned above may be used. As a preferable positive electrode collector, foil of a metal, such as aluminum or an aluminum alloy containing aluminum as a primary component, stable in a potential range of the positive electrode may be mentioned.

The positive electrode active material layer preferably contains a positive electrode active material, an electrically conductive agent, and a binder. The positive electrode 12 is formed, for example, such that after a positive electrode mixture slurry containing the positive electrode active material, the electrically conductive agent the binder, a solvent, such as N-methyl-2-pyrrolidone (NMP), and the like is applied on the two surfaces of the positive electrode collector, drying and rolling are performed.

As the positive electrode active material, for example, a lithium composite oxide containing a transition metal element, such as Co, Mn, or Mi, may be mentioned. As the lithium composite oxide, for example, there may be mentioned $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$ $Li_xMn_ZO_4$, $Li_xMn_{2-y}M_yO_4$, $LiMPO_4$, or $Li_2MPO_4F$ ($0<x\leq1.2$, $0<y\leq0.9$, $2.0\leq z\leq2.3$, and M is at least one of Na, Mg, Sc, Y, Mn, Fe, Co, Ni, Cu, Zn, Al, Cr, Pb, Sb, and B).

As an example of the above electrically conductive agent, for example, there may be mentioned a carbon material such as carbon black (CB), acetylene black (AB), Ketjen black, or graphite. As an example of the above binder, for example, a fluorine-based resin, such as a polytetrafluoroethylene (PTFE) or a poly(vinylidene fluoride) (PVdF), a polyacrylonitrile (PAN), a polyimide (PI), an acrylic resin, or a polyolefinic resin. In addition, those resins each may be used together with a carboxymethyl cellulose (CMC) or its salt, a polyethylene oxide (PEO), or the like. Those materials may be used alone or at least two types thereof may be used in combination.

The positive electrode lead 16 is bonded to an uncoated area of the positive electrode collector, and a part of the positive electrode lead 16 which projects from the positive electrode collector toward the upper side is connected to the filter 24. The uncoated area is an area at which the surface of the positive electrode collector is exposed without being provided with the positive electrode active material layer.

Figure 4:
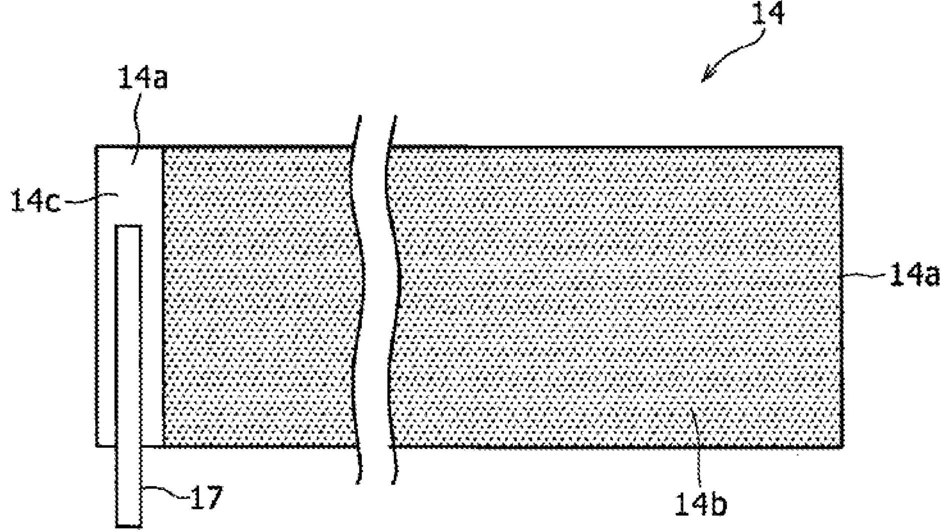
FIG. 4 is a view of a development state of a negative electrode which is removed from the structure shown in FIG. 1.

FIG. 4 is a view of a development state of the negative electrode 14 which is removed from the structure shown in FIG. 1. The negative electrode 14 includes a negative electrode collector 14*a* and at least one negative electrode active material layer 14*b* formed on the negative electrode collector 14*a*. For example, on two surfaces of the negative electrode collector 14*a*, the negative electrode active material layers 14*b* are formed. For the negative electrode collector 14*a*, for example, foil of a metal, such as aluminum or copper, stable in a potential range of the negative electrode or a film having a surface layer formed of the metal mentioned above may be used.

The negative electrode active material layer 14*b* is preferably formed over the entire region of each of the two surfaces of the negative electrode collector 14*a* except for an uncoated area 14*c* which will be described later. The negative electrode active material layer 14*b* preferably contains a negative electrode active material and a binder. The negative electrode active material layer 14*b* may also contain an electrically conductive agent, if needed. The negative electrode 14 is formed, for example, such that after a negative electrode mixture slurry containing the negative electrode active material, the binder, water, and the like is applied on the two surfaces of the negative electrode collector 14*a*, drying and rolling are performed.

The negative electrode active material is not particularly limited as long as being capable of occluding and releasing lithium ions, and for example, natural graphite, artificial graphite, lithium, silicon, carbon, tin, germanium, aluminum, lead, indium, gallium, a lithium alloy, carbon or silicon which occludes lithium in advance, or an alloy or a mixture of those mentioned above may be used. For the binder contained in the negative electrode active material layer, for example, a resin similar to that for the positive electrode 12 may be used. When the negative electrode mixture slurry is prepared using an aqueous solvent, for example, a styrene-butadiene rubber (SBR), a CMC or its salt, a poly(acrylic acid) or its salt, or a poly(vinyl alcohol) may be used. Those compounds mentioned above may be used alone, or at least two types thereof may be used in combination.

The negative electrode 14 has the uncoated area 14*c* at which the surface of the metal forming the negative electrode collector 14*a* is exposed. The uncoated area 14*c* is an area to which the negative electrode lead 17 is connected and is an area in which the surface of the negative electrode collector 14*a* is not covered with the negative electrode active material layer. The uncoated area 14*c* has, when viewed from the front, a rectangular shape extending long in the axial direction which is a width direction of the negative electrode 14 and is formed wider than the negative electrode lead 17. The uncoated area 14*c* is formed at one end portion (left end portion in FIG. 4) of the negative electrode 14 in a longitudinal direction which functions as the winding-finish side end portion.

The negative electrode lead 17 is bonded to the surface of the uncoated area 14*c* of the negative electrode collector 14*a* by welding, such as ultrasonic welding. The uncoated area 14*c* is provided, for example, by intermittent coating in which the negative electrode mixture slurry is not applied on a part of the negative electrode collector 14*a*.

In this embodiment, although the case in which the negative electrode lead 17 is bonded to the winding-finish side end portion of the negative electrode collector 14*a* will be described, the structure is not limited thereto, and the negative electrode lead may also be bonded to a central portion of the negative electrode collector in the longitudinal direction.

For the separator 15, for example, a porous sheet having an ion permeability and an insulating property may be used. As a particular example of the porous sheet, for example, a fine porous thin film, a woven cloth, or a non-woven cloth may be mentioned. As a material of the separator 15, for example, a cellulose or an olefin resin, such as a polyethylene or a polypropylene, is preferable. The separator 15 may be a laminate having a cellulose fiber layer and a thermoplastic resin fiber layer formed of an olefinic resin or the like.

As the nonaqueous solvent of the electrolyte, for example, an ester, an ether, a nitrile such as acetonitrile, an amide such as dimethylformamide, or a mixed solvent containing at least two of those solvents may be used. The nonaqueous solvent may also contain a halogen substitute in which hydrogen of each of the solvents mentioned above is substituted by a halogen atom, such as fluorine.

In this embodiment, the negative electrode lead 17 is connected to the inner surface of the bottom portion 52 of the exterior package can 51. The exterior package can 51 functions as a negative electrode external terminal.

Next, the welding group 41 which welds the negative electrode lead 17 and the exterior package can 51 will be described. The welding portions 42, 43, and 44 (FIGS. 2 and 3) forming the welding group 41 are each formed from the molten mark as described above. As shown in FIG. 3, when the welding group 41 is viewed from the outside (lower side in FIG. 1) of the bottom portion 52 of the exterior package can 51, the three welding portions 42, 43, and 44 are formed to have linear shapes parallel to each other. The welding portions 42, 43, and 44 have approximately the same length.

The three welding portions 42, 43, and 44 are each formed in an area of the bottom portion 52 which faces the U-shaped portion 18 of the negative electrode lead 17. The outside section 19 (FIG. 2) of the U-shaped portion 18 is disposed along the inner surface of the bottom portion 52. The welding portions 42, 43, and 44 weld the bottom portion 52 and the negative electrode lead 17 by partially melting the negative electrode lead 17 and the bottom portion 52. The three welding portions 42, 43, and 44 are formed such that one laser light is branched into the three laser lights 40 using a multi-branching optical element, and the three laser lights 40 are radiated from the outside of the exterior package can 51 to the bottom portion 52 thereof.

As the laser light, laser light of a fiber laser is preferably used. Since a spot diameter of the fiber laser can be significantly decreased, for example, to approximately 0.02 to 0.05 mm, the width of the molten mark formed by this fiber laser can also be significantly decreased to approximately 0.1 mm. Hence, a power density of a focus point of the laser light can be significantly increased. As shown in FIG. 3, when the three welding portions 42, 43, and 44 are viewed from the outside of the bottom portion 52, the welding portions 42, 43, and 44 each have a length of approximately 0.5 to 2.0 mm. In addition, the welding portions 42, 43, and 44 each have a width of approximately 0.05 to 0.20 mm.

The laser light 40 is not limited to the three-branched laser light. For example, the three welding portions 42, 43, and 44 may be formed, for example, such that a radiation portion of the laser light is transferred on an outside surface of the bottom portion 52 of the exterior package can 51 toward one side (for example, right side in FIG. 1) along a linear line direction, and this operation is repeatedly performed.

In addition, when the battery 10 is transferred relatively to a direction orthogonal to the radiation direction of the laser light, the welding portions 42, 43, and 44 formed by the laser light are each likely to have a linear shape when viewed from the outside of the bottom portion 52. In this step, when the battery 10 is disposed while the bottom portion 52 is placed at an upper side, the laser light may be radiated to the bottom portion. When the battery 10 is disposed while the bottom portion 52 is tilted, the laser light may also be radiated to the bottom portion 52.

When the negative electrode lead 17 has no U-shaped portion 18 thus folded, in general, the output of the laser light 40 is set so as to form a molten portion from the bottom portion 52 of the exterior package can 51 to the center of the negative electrode lead 17. In this case, in order to secure a welding strength between the negative electrode lead 17 and the exterior package can 51, and in addition, in order to prevent the molten portion from penetrating the negative electrode lead 17, an output margin of the laser light 40 is required to be strictly controlled. On the other hand, when the negative electrode lead 17 has the U-shaped portion 18 thus folded, since the molten portion can be formed not only in the outside section 18 of the U-shaped portion 18 but also in the inside section thereof, the output margin of the laser light 40 is increased. For example, when the output margin of the laser light 40 is assumed to 100 in the case in which no U-shaped portion 18 is provided, the output margin of the laser light 40 is increased to 150 or more in the case in which the U-shaped portion 18 is provided.

The negative electrode lead 17 is a single-layered metal conductive wire containing nickel as a primary component. The metal forming the negative electrode lead 17 is, for example, nickel or a nickel alloy. The negative electrode lead 17 is preferably a flat square wire having an approximately rectangular cross-sectional shape orthogonal to the longitudinal direction, and the width and the thickness of the rectangular cross-section are, for example, approximately 2 to 5 mm and 0.05 to 0.2 mm, respectively.

[Method for Manufacturing Battery]

Next, a method for manufacturing the battery 10 according to this embodiment will be described. The method for manufacturing the battery 10 comprises an electrode body receiving step and a lead welding step. First, in the electrode body receiving step, while the U-shaped portion 18 of the negative electrode lead 17 is disposed to face the inner surface of the bottom portion 52 of the exterior package can 51, the electrode body 11 is received in the exterior package can 51. In the state described above, the positive electrode lead 16 is disposed at an opening portion side of the exterior package can 51.

Next, while the electrode body 11 is held so as not to move with respect to the exterior package can 51, the entire electrode body 11 is pressurized from the opening portion side of the exterior package can 51, so that the U-shaped portion 18 of the negative electrode lead 17 and the bottom portion 52 of the exterior package can 51 are brought into close contact with each other.

In the lead welding step, while the U-shaped portion 18 of the negative electrode lead 17 is placed in close contact with the bottom portion 52, from the outside of the bottom portion 52, the laser light is radiated to an area of the bottom portion 52 which faces the outside section 19 of the U-shaped portion 18 of the negative electrode lead 17, the outside section 19 being in contact with the bottom portion 52. Accordingly, the negative electrode lead 17 is welded to the exterior package can 51 with the welding group 41. Since the negative electrode lead 17 is folded at the front end portion thereof as described above, the U-shaped portion 18 is formed.

According to the battery 10 and the method for manufacturing the battery described above, at least a part of a portion of the U-shaped portion 18 of the negative electrode lead 17 which is in contact with the exterior package can 51 and the exterior package can 51 are welded to each other with the welding group 41 formed by the laser light radiated from the outside of the exterior package can 51. Accordingly, during the radiation of the laser light, the welding portions 42, 43, and 44 of the welding group 41 formed by the laser light, are suppressed from penetrating the negative electrode lead 17 so as to reach the surface of the inside section 20 of the negative electrode lead 17 at an electrode body 11 side. Accordingly, since the generation of sputtering is suppressed in the exterior package can 51, intrusion of foreign materials generated by sputtering in the battery can be suppressed. In addition, since the entire thickness of the negative electrode lead 17 is not required to be increased in order to suppress the generation of sputtering, the decrease in battery capacity can be suppressed. In addition, since the negative electrode lead 17 is folded to form the U-shaped portion 18, and the laser light is radiated to the area of the bottom portion 52 which faces the U-shaped portion 18, even when the output (laser output) of the laser light is increased, the intrusion of foreign materials generated by sputtering in the battery can be suppressed.

Figure 5:
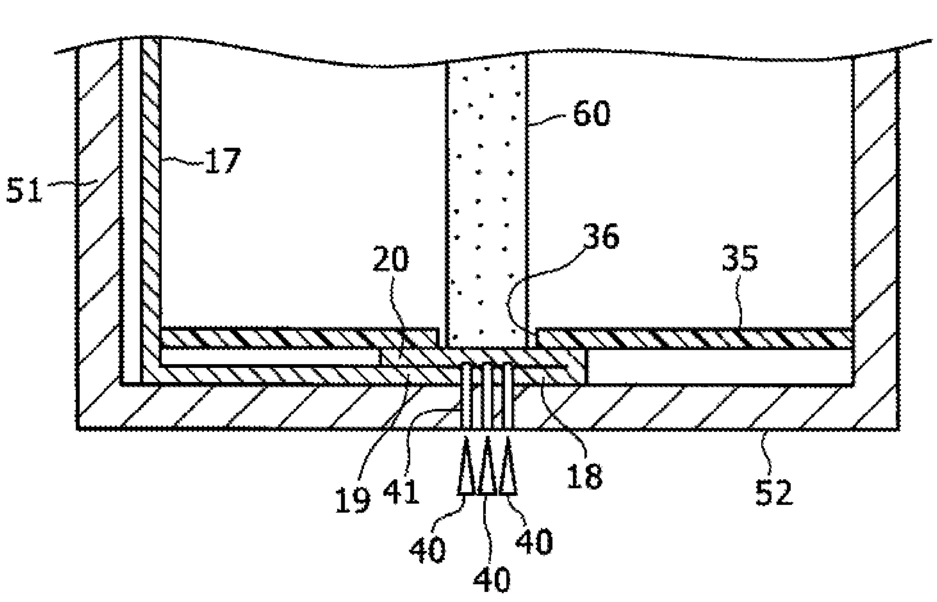
FIG. 5 is a view shewing, in a method for manufacturing a battery according to another example of the embodiment, a state in which an exterior package can and a lead are welded to each other and is a view corresponding to a lower half of the structure shown in FIG. 1 from which an electrode body is omitted.

FIG. 5 is a view showing, in a method for manufacturing a battery according to another example of the embodiment, a state in which the negative electrode lead 17 and the exterior package can 51 are welded to each other and is a view corresponding to a lower half of the structure shown in FIG. 1 from which the electrode body is omitted. In the case of the manufacturing method of this example, in the lead welding step, after the electrode body 11 (FIG. 1) is inserted in the exterior package can 51, a presser bar 60 is inserted into the winding core portion of the electrode body 11 from the above. In addition, a part of the presser bar 60 which penetrates the through-hole 36 at the central portion of the lower insulating plate 35 presses the U-shaped portion 16 of the negative electrode lead 17 from the above. Accordingly, the exterior package can 51 and the negative electrode lead 17 are placed in close contact with each other, and in the state described above, the laser light 40 is radiated from the outside of the exterior package can 51 to the area of the bottom portion 52 which faces the U-shaped portion 18, so that the welding group 41 is formed. In this example, the other structures and functions are similar to those described with reference to FIGS. 1 to 4.

Figure 6:
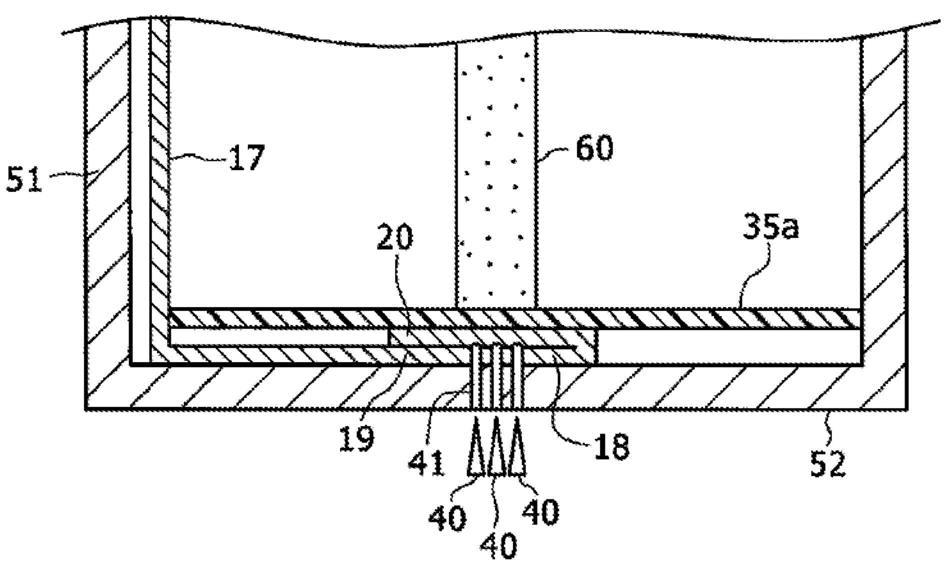
FIG. 6 is a view of a battery according to another example of the embodiment which corresponds to that shown in FIG. 5.

FIG. 6 is a view of a battery according to another example of the embodiment which corresponds to that shown in FIG. 5. In the case of this example, no through-hole is formed in a lower insulating plate 35*a*. In the lead welding step, after the electrode body 11 (FIG. 1) is inserted in the exterior package can 51, the presser bar 60 is inserted in the winding core portion of the electrode body 11 from the above, and a lower end of the presser bar 60 is butted on the lower insulating plate 35*a*. This presser bar 60 presses the U-shaped portion 18 of the negative electrode lead 17 from the above with the insulating plate 35*a* interposed therebetween, so that the exterior package can 51 and the negative electrode lead 17 are placed in close contact with each other. In the state described above, the laser light 40 is radiated from the outside to the area of the bottom portion 52 which faces the U-shaped portion 18, so that the welding group 41 is formed.

According to the structure described above, since the through-hole is not formed in the lower insulating plate 35*a*, even if sputtering is generated under the insulating plate 35*a* in the exterior package can 51 during the welding, the sputtering can be suppressed from intruding into an electrode body 11 side. In addition, since the negative electrode lead 17 is not able to extend in the electrode body 11 through the through-hole of the insulating plate 35*a* a short circuit can be prevented without strictly controlling the dimensions of the negative electrode lead 17. Hence, the dimensional control of the negative electrode lead 17 can be easily performed.

In addition, a front end portion of the presser bar 60 is pressed to the negative electrode lead 17 with the insulating plate 35*a* interposed therebetween toward an exterior package can 51 side. In this step, when the presser bar 60 is formed from a metal, and the insulating plate 35*a* is formed from a resin, in the case in which the flatness of a front end surface of the presser bar 60 is low the influence of this flatness on the adhesion between the negative electrode lead 17 and the exterior package can 51 is likely to be absorbed by elastic deformation of the insulating plate 35*a*. Accordingly, since the negative electrode lead 17 can be suppressed from floating from the bottom portion 52, the generation of sputtering can be further suppressed, and in addition, the control of the flatness of the front end of the presser bar 60 can be easily performed. In addition, since the through-hole is not required to be formed in the insulating plate 35*a*, the cost can be reduced. In this example, the other structures and functions are similar to those described with reference to FIGS. 1 to 4.

Figure 7:
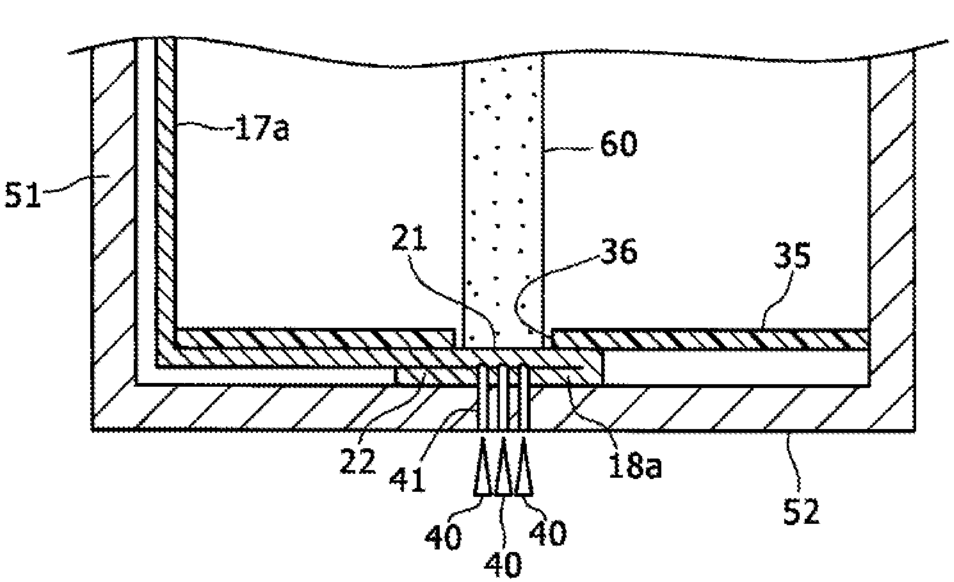
FIG. 7 is a view of a battery according to another example of the embodiment which corresponds to that shown in FIG. 5.

FIG. 7 is a view of a battery according to another example of the embodiment which corresponds to that shown in FIG. 5. In the case of this example, since being folded outside to have a cross-sectional U shape, a negative electrode lead 17*a* has at a front end portion, a U-shaped portion 18*a*. In particular, the U-shaped portion 18*a* is formed by folding a part of the negative electrode lead 17*a* to the outside which is a side of the bottom portion 52 so as to be continuously in contact with the bottom portion 52, the part of the negative electrode lead 17*a* being apart from the bottom portion 52 of the exterior package can 51 from the connection side to the negative electrode 14 (FIG. 1) to the front end. In the U-shaped portion 13*a*, an inside section 21 and an outside section 22 which is located at a front end side than the inside section 21 are overlapped with each other. Accordingly, the front end of the negative electrode lead 17*a* at a U-shaped portion 18*a* side is folded to the outside which is the side of the exterior package can 51 so as to be in contact with the exterior package can 51. In the negative electrode lead 17*a*, the outside section 22 of the U-shaped portion 18*a* is overlapped on and is brought into contact with the inner surface of the bottom portion 52 so as to be disposed along the bottom portion 52. In addition, in the state described above, since the laser light 40 is radiated from the outside of the exterior package can 51 to an area of the bottom portion 52 which faces the outside section 22 of the U-shaped portion 18*a*, the bottom portion 52 and the outside section 22 of the negative electrode lead 17*a* are welded to each other with the welding group 41. In this step, the welding group 41 may reach the inside section 21 of the U-shaped portion 15*a* so that the inside section 21, the outside section 22, and the bottom portion 52 are welded to each other with the welding group 41. In this example, the other structures and functions are similar to those described with reference to FIGS. 1 to 4.

Figure 8:
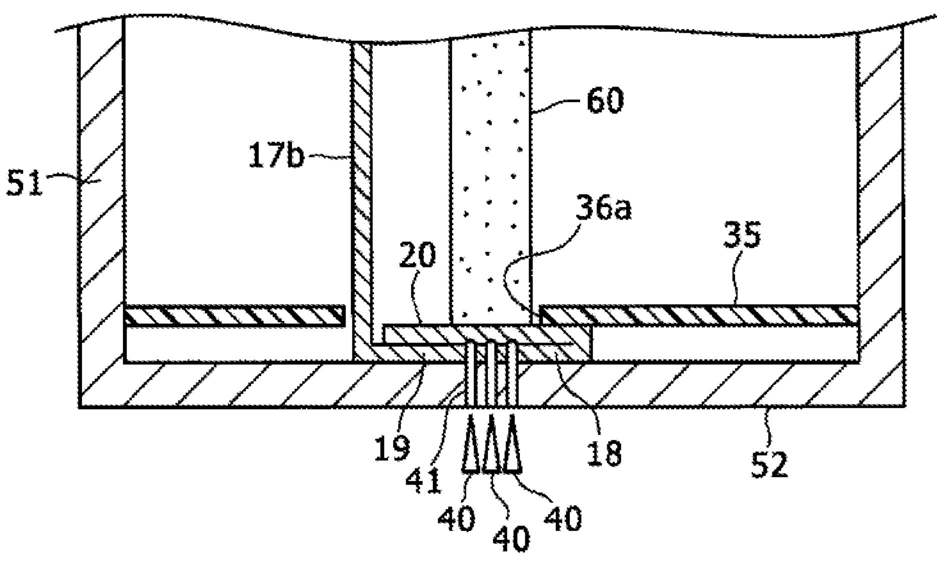
FIG. 8 is a view of a battery according to another example of the embodiment which corresponds to that shown in FIG. 5.

FIG. 8 is a view of a battery according to another example of the embodiment which corresponds to that shown in FIG. 5. In the case of this example, to a winding-start side end portion of the negative electrode 14 (FIG. 1), a negative electrode lead 17*b* is bonded. A lower end portion of the negative electrode lead 17*b* extends to the bottom portion 52 side of the exterior package can 51 through a through-hole 36*a* of the lower insulating plate 35. The negative electrode lead 17*b* is bent at an approximately right angle near the bottom portion 52 of the exterior package can 51 and is disposed along the bottom portion 52. At a front end portion of the negative electrode lead 17*b*, as is the structures shown in FIGS. 1 to 4, the U-shaped portion 18 is formed.

In the lead welding step, after the electrode body 11 (FIG. 1) is inserted in the exterior package can 51, the presser bar 60 is inserted in the winding core portion of the electrode body 11 from the above. In addition, by a part of the presser bar 60 which penetrates the through-hole 36*a* of the lower insulating plate 35, the U-shaped portion 18 of the negative electrode lead 17*b* is pressed from the above. Accordingly, the exterior package can 51 and the negative electrode lead 17*b* are placed in close contact with each other, and in the state described above, the laser light 40 is radiated from the outside of the exterior package can 51 to the area of the bottom portion 52 which faces the U-shaped portion 18, so that the welding group 41 is formed. In this example, the other structures and functions are similar to those described with reference to FIGS. 1 to 4.

Figure 9:
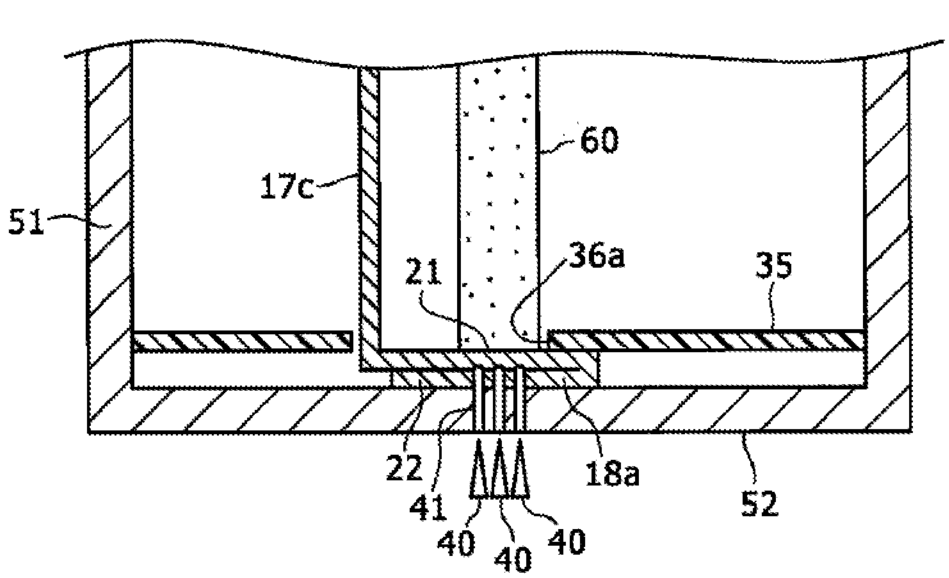
FIG. 9 is a view of a battery according to another example of the embodiment which corresponds to that shown in FIG. 5.

FIG. 9 is a view of a battery according to another example of the embodiment which corresponds to that shown in FIG. 5. In the case of this example, as a U-shaped portion 18*a* formed at a front end portion of a negative electrode lead 17*c*, a part thereof apart from the bottom portion 52 of the exterior package can 51 from the connection side to the negative electrode 14 (FIG. 1) to the front end is folded so as to be continuously in contact with the inner surface of the bottom portion 52. In this step, the U-shaped portion 18*a* is folded to the outside which is the bottom portion 52 side. In the U-shaped portion 18*a*, an inside section 21 and an outside section 22 which is located at a front end side than the inside section 21 are overlapped with each other. In the negative electrode lead 17*c*, the outside section 22 of the U-shaped portion 18*a* is overlapped on and is brought into contact with the inner surface of the bottom portion 52 so as to be disposed along the bottom portion 52. In addition, in the state described above, since the laser light 40 is radiated from the outside of the exterior package can 51 to the area of the bottom portion 52 which faces the outside section 22 of the U-shaped portion 18*a*, the bottom portion 52 and the outside section 22 of the negative electrode lead 17*c* are welded to each other with the welding group 41. In this example, the other structures and functions are similar to those described with reference to FIGS. 1 to 4, FIG. 7, or FIG. 8.

Figure 10:
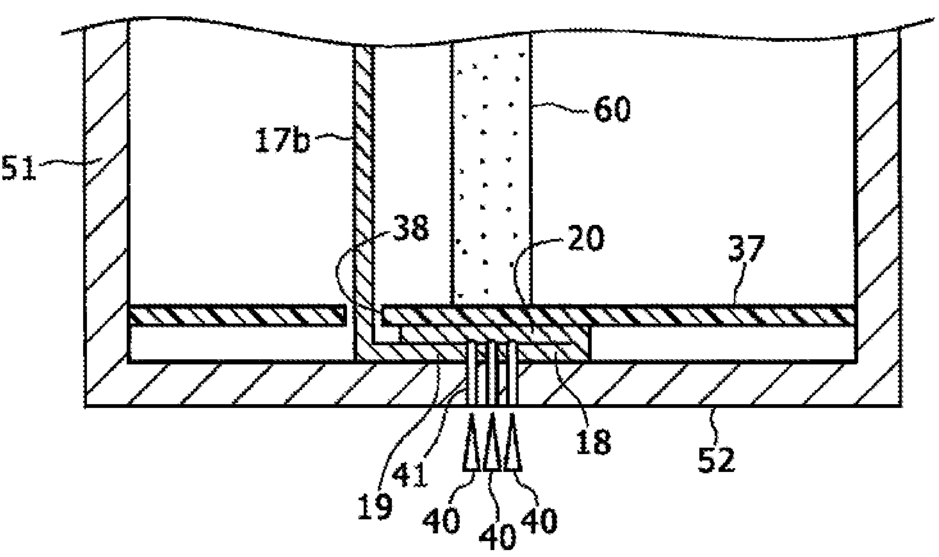
FIG. 10 is a view of a battery according to another example of the embodiment which corresponds to that shown in FIG. 5.
Figure 11:
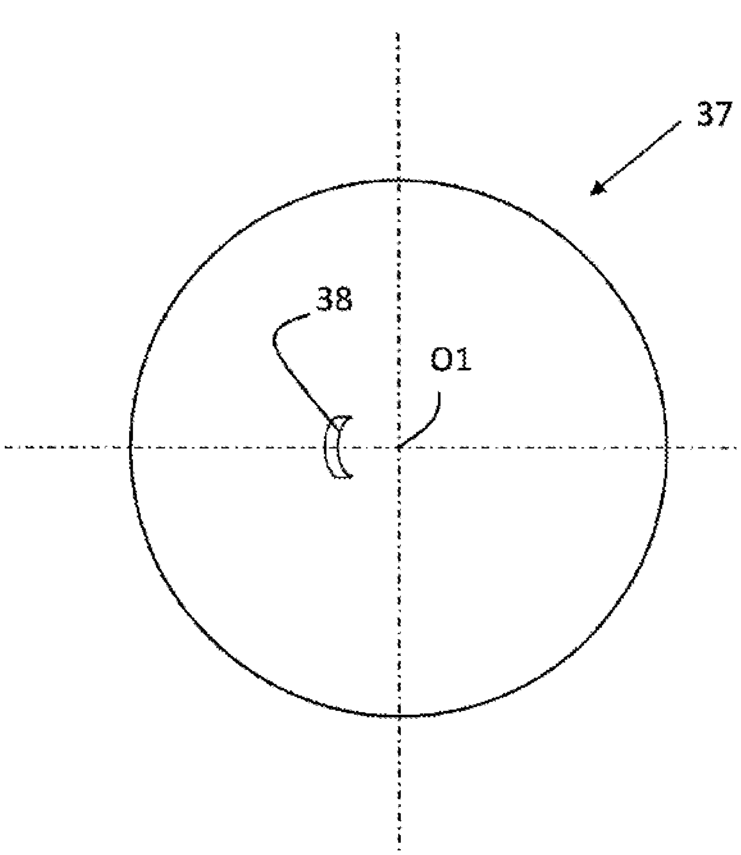
FIG. 11 is a view of a lower insulating plate removed from the structure shown in FIG. 10.

FIG. 10 is a view of a battery according to another example of the embodiment which corresponds to that shown in FIG. 5. FIG. 11 is a view of a lower insulating plate 37 which is removed from the structure shown in FIG. 10. In the case of this example, as shown in FIG. 11, in an area of the lower insulating plate 37 along a circumferential direction apart from a center O1 thereof to the outside in the radius direction, an arc-shaped slit 38 is formed so as to penetrate in a thickness direction (direction orthogonal to the plane of FIG. 11). As shown in FIG. 10, as is the structure shown in FIG. 3, the negative electrode lead 17*b* is bended to the winding-start side end portion of the negative electrode 14 (FIG. 1). The negative electrode lead 17*b* extends to the bottom portion 52 side of the exterior package can 51 through the slit 38 of the lower insulating plate 37. The negative electrode lead 17*b* is bent at an approximately right angle near the bottom portion 52 of the exterior package can 51 and is disposed along the bottom portion 52. At the front end portion of the negative electrode lead 17*b*, as is the structure shown in FIGS. 1 to 4, the U-shaped portion 18 is formed.

In the lead welding step, after the electrode body 11 (FIG. 1) is inserted in the exterior package can 51, the presser bar 60 is inserted in the winding core portion of the electrode body 11 from the above. In addition, as is the structure shown in FIG. 6, the D-shaped portion 18 of the negative electrode lead 17*b* is pressed by the presser bar 60 from the above with the insulating plate 37 interposed therebetween, so that the exterior package can 51 and the negative electrode lead 17*b* are placed in close contact with each other. In the state described above, the laser light 40 is radiated from the outside of the exterior package can 51 to the area of the bottom portion 52 which faces the U-shaped portion 18, so that the welding group 41 is formed. In this example, the other structures and functions are similar to those described with reference to FIGS. 1 to 4.

In each of the examples described above, although the case in which the negative electrode lead and the exterior package can are welded to each other with the welding group formed of the three welding portions has been described, the present disclosure is not limited thereto. For example, the negative electrode lead and the exterior package can may be welded to each other with a welding group formed of two or at least three welding portions or with only one welding portion.

In each of the examples described above, although the case in which one negative electrode lead is connected to the negative electrode has been described, at least two negative electrode leads may be connected to the negative electrode. For example, to the winding-start side end portion and the winding-finish side end portion of the negative electrode, the two negative electrode leads may be separately connected. In this case, at the front end portion of at least one of the two negative electrode leads, the U-shaped portion is formed. As described above, when at least two negative electrode leads are connected to the negative electrode, the output characteristics of the battery can be improved by decreasing the internal resistance of the battery.

In each of the examples described above, although the case in which the negative electrode lead connected to the negative electrode is welded to the exterior package can has been described, when the positive electrode lead connected to the positive electrode is welded to the exterior package can, the structure of the present disclosure may also be applied thereto.

REFERENCE SIGNS LIST

10 battery, 11 electrode body, 11*a* winding core portion, 12 positive electrode, 14 negative electrode, 14*a* negative electrode collector, 14*b* negative electrode active material layer, 14*c* uncoated area, 15 separator, 16 positive electrode lead, 17 negative electrode lead, 18, 18*a* U-shaped portion, 19 outside section, 20 inside section, 21 inside section, 22 outside section, 23 sealing body, 24 filter, 25 lower valve, 26 insulating plate, 27 upper valve, 28 cap, 29 gasket, 30 negative electrode lead, 33 insulating plate, 34 through-hole, 35, 35*a* insulating plate, 36, 36*a* through-hole, 37 insulating plate, 38 slit, 40 laser light, 41 welding group, 42, 43, 44 welding portion, 51 exterior package can, 51*a* Ni plating layer, 52 bottom portion, 60 presser bar

The invention claimed is:

1. A battery comprising:

an electrode body in which at least one positive electrode and at least one negative electrode are spirally wound with at least one separator interposed therebetween; and a cylindrical exterior package can which receives the electrode body within a closed interior of the exterior package can, wherein the electrode body includes a lead connected to one of the positive electrode and the negative electrode, wherein the lead is enclosed within the closed interior of the cylindrical exterior package can and interposed between the electrode body and a circular base portion of the cylindrical exterior package can, the lead is an elongated rectangular piece of metal having an end portion thereof protruding from the electrode body toward the circular base portion of the cylindrical exterior package can, wherein the end portion of the lead has an L-shaped profile defined by:

a first section that extends parallel to a winding axis of the electrode body, and a second section that extends parallel to the circular base portion of the cylindrical exterior package can, wherein the second section of the end portion of the lead defines a U-shaped portion having a cross-sectional U shape including an inside section, and an outside section opposite the inside section, wherein the circular base portion of the cylindrical exterior package can, the inside section, and the outside section are configured to overlap each other when viewed in a thickness direction of the circular base portion of the cylindrical exterior package can, and the cylindrical exterior package can and at least a part of a portion of the U-shaped portion which is in contact with the cylindrical exterior package can are welded to each other with a welding portion formed by energy beams radiated from the outside of the cylindrical exterior package can, wherein the welding portion extends from the circular base portion of the cylindrical exterior package can through an entirety of the outside section and only a part less than entirety of the inside section in the thickness direction of the circular base portion of the cylindrical exterior package can, and the welding portion is located to face a winding core portion including the winding central axis of the electrode body.

2. The battery according to claim 1, wherein the lead is a negative electrode lead bonded to a winding-finish side end portion of the negative electrode.

3. The battery according to claim 2, wherein a front end of the negative electrode lead at a side of the U-shaped portion is folded to the inside of the exterior package can so as to be apart from the exterior package can.

4. The battery according to claim 2, wherein a front end of the negative electrode lead at a side of the U-shaped portion is folded to the outside which is a side of the exterior package can so as to be in contact with the exterior package can.

5. The battery according to claim 1, wherein the lead is a negative electrode lead connected to a winding-start side end portion of the negative electrode.

6. The battery according to claim 5, wherein a front end of the negative electrode lead at a side of the U-shaped portion is folded to the inside of the exterior package can so as to be apart from the exterior package can.

7. The battery according to claim 5, wherein a front end of the negative electrode lead at a side of the U-shaped portion is folded to the outside which is a side of the exterior package can so as to be in contact with the exterior package can.

8. A method for manufacturing the battery according to claim 1, the method comprising:

a welding step of welding the lead to the exterior package can while the lead connected to one of the positive electrode and the negative electrode is folded, wherein in the welding step, energy beams are radiated from the outside of the exterior package can to an area of the exterior package can which faces a part of the U-shaped portion of the lead in contact with the exterior package can to weld the exterior package can and the lead to each other with the welding portion.

9. The method for manufacturing the battery, according to claim 8, wherein the lead is a negative electrode lead bonded to a winding-finish side end portion of the negative electrode or a winding-start side end portion of the negative electrode.

10. The method for manufacturing the battery, according to claim 9, wherein a front end of the negative electrode lead at a side of the U-shaped portion is folded to the inside of the exterior package can so as to be apart from the exterior package can or is folded to the outside which is a side of the exterior package can so as to be in contact with the exterior package can.

11. The battery according to claim 1, wherein the battery further comprises an insulating plate interposed between the electrode body and the U-shaped portion of the lead in the thickness direction of the portion of the exterior package can, wherein the inside section of the U-shaped portion directly contacts the insulating plate.

12. The battery according to claim 1, wherein the battery further comprises an insulating plate interposed between the electrode body and the U-shaped portion of the lead in the thickness direction of the portion of the exterior package can, wherein the insulating plate comprises a through hole overlapping a portion of the inside section of the U-shaped portion, when viewed in in the thickness direction of the portion of the exterior package can.

13. The battery according to claim 1, wherein the battery further comprises an insulating plate interposed between the electrode body and the U-shaped portion of the lead in the thickness direction of the portion of the exterior package can, wherein the insulating plate overlaps an entirety of the inside section of the U-shaped portion, when viewed in in the thickness direction of the portion of the exterior package can.

14. A method for manufacturing a battery comprising:

an electrode body in which at least one positive electrode and at least one negative electrode are spirally wound with at least one separator interposed therebetween; and a cylindrical exterior package can which receives the electrode body within a closed interior of the exterior package can, wherein the electrode body includes a lead connected to one of the positive electrode and the negative electrode, wherein the lead is enclosed within the closed interior of the cylindrical exterior package can and interposed between the electrode body and a circular base portion of the cylindrical exterior package can, the lead is an elongated rectangular piece of metal having an end portion thereof protruding from the electrode body toward the circular base portion of the cylindrical exterior package can, wherein the end portion of the lead has an L-shaped profile defined by:

a first section that extends parallel to a winding axis of the electrode body, and a second section that extends parallel to the circular base portion of the cylindrical exterior package can, wherein the second section of the end portion of the lead defines a U-shaped portion having a cross-sectional U shape including an inside section, and an outside section opposite the inside section, wherein the circular base portion of the cylindrical exterior package can, the inside section, and the outside section are configured to overlap each other when viewed in a thickness direction of the circular base portion of the cylindrical exterior package can, and the cylindrical exterior package can and at least a part of a portion of the U-shaped portion which is in contact with the cylindrical exterior package can are welded to each other with a welding portion formed by energy beams radiated from the outside of the cylindrical exterior package can, wherein the welding portion extends from the circular base portion of the cylindrical exterior package can through an entirety of the outside section and only a part less than entirety of the inside section in the thickness direction of the circular base portion of the cylindrical exterior package can, and the welding portion is located to face a winding core portion including the winding central axis of the electrode body, the method comprising:

a welding step of welding the lead to the exterior package can while the lead connected to one of the positive electrode and the negative electrode is folded, wherein in the welding step, energy beams are radiated from the outside of the exterior package can to an area of the exterior package can which faces a part of the U-shaped portion of the lead in contact with the exterior package can to weld the exterior package can and the lead to each other with the welding portion, wherein in the welding step, a pressing bar is inserted into the exterior package can to press the U-shaped portion against the portion of the exterior package can.

* * * * *